United States Patent
Artamonov et al.

(10) Patent No.: US 8,032,822 B1
(45) Date of Patent: Oct. 4, 2011

(54) METHOD AND SYSTEM FOR EXPLAINING DEPENDENCIES ON A DOCUMENT

(75) Inventors: Michael A. Artamonov, San Diego, CA (US); Michael Wang, San Diego, CA (US); Bradford R. Brown, San Diego, CA (US); Jay Jie-Bing Yu, San Diego, CA (US); James S. Gillespie, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1160 days.

(21) Appl. No.: 11/494,915

(22) Filed: Jul. 28, 2006

(51) Int. Cl.
*G06F 17/00* (2006.01)

(52) U.S. Cl. ........ 715/221; 715/234; 715/255; 709/220; 717/141; 717/143; 717/144; 705/31; 705/19; 704/9

(58) Field of Classification Search ........... 715/221–226
See application file for complete search history.

(56) References Cited

U.S. PATENT DOCUMENTS

| | | | |
|---|---|---|---|
| 5,367,619 A * | 11/1994 | Dipaolo et al. | 715/221 |
| 5,640,501 A * | 6/1997 | Turpin | 715/224 |
| 5,745,712 A * | 4/1998 | Turpin et al. | 715/763 |
| 5,875,334 A * | 2/1999 | Chow et al. | 717/141 |
| 6,185,582 B1 * | 2/2001 | Zellweger et al. | 715/212 |
| 6,594,783 B1 * | 7/2003 | Dollin et al. | 714/38.14 |
| 6,968,500 B2 * | 11/2005 | Mikhailov et al. | 715/221 |
| 7,032,170 B2 * | 4/2006 | Poulose et al. | 715/222 |
| 7,100,112 B1 * | 8/2006 | Winser | 715/210 |
| 7,117,433 B1 * | 10/2006 | Glaser et al. | 715/205 |
| 7,296,028 B1 * | 11/2007 | Ivanova | 1/1 |
| 7,451,392 B1 * | 11/2008 | Chalecki et al. | 715/234 |
| 7,496,837 B1 * | 2/2009 | Larcheveque et al. | 715/237 |
| 7,516,121 B2 * | 4/2009 | Liu et al. | 1/1 |
| 7,536,448 B2 * | 5/2009 | Hasan et al. | 709/220 |
| 7,607,078 B2 * | 10/2009 | Geva et al. | 715/221 |
| 7,877,682 B2 * | 1/2011 | Aegerter | 715/237 |
| 2001/0014899 A1 * | 8/2001 | Fujikawa | 707/513 |
| 2001/0054046 A1 * | 12/2001 | Mikhailov et al. | 707/500 |
| 2002/0082857 A1 * | 6/2002 | Skordin et al. | 705/1 |
| 2002/0111961 A1 * | 8/2002 | Billings et al. | 707/505 |
| 2002/0165875 A1 * | 11/2002 | Verta | 707/503 |
| 2002/0174222 A1 * | 11/2002 | Cox | 709/224 |
| 2003/0036912 A1 * | 2/2003 | Sobotta et al. | 705/1 |
| 2003/0061022 A1 * | 3/2003 | Reinders | 704/2 |
| 2003/0182102 A1 * | 9/2003 | Corston-Oliver et al. | 704/9 |
| 2004/0078271 A1 * | 4/2004 | Morano et al. | 705/19 |
| 2004/0205529 A1 * | 10/2004 | Poulose et al. | 715/506 |
| 2004/0237030 A1 * | 11/2004 | Malkin | 715/505 |
| 2004/0237040 A1 * | 11/2004 | Malkin et al. | 715/526 |
| 2005/0108625 A1 * | 5/2005 | Bhogal et al. | 715/505 |
| 2006/0080594 A1 * | 4/2006 | Chavoustie et al. | 715/503 |
| 2006/0212859 A1 * | 9/2006 | Parker et al. | 717/143 |
| 2007/0009158 A1 * | 1/2007 | Geva et al. | 382/209 |
| 2007/0055966 A1 * | 3/2007 | Waddington et al. | 717/144 |
| 2007/0226708 A1 * | 9/2007 | Varma | 717/139 |

* cited by examiner

*Primary Examiner* — Doug Hutton, Jr.
*Assistant Examiner* — Benjamin Smith
(74) *Attorney, Agent, or Firm* — Osha • Liang LLP

(57) ABSTRACT

A method for reviewing data dependencies in a document that includes requesting an explanation of a dependent data container in a plurality of data containers, in which the dependent data container resides within a document, and receiving the explanation of the dependent data container, in which the explanation that includes information about the dependent data container and information about a precedent data container of the plurality of data containers, and in which the information describes the dependency between the precedent data container and the dependent data container.

27 Claims, 12 Drawing Sheets

METHOD AND SYSTEM FOR EXPLAINING DEPENDENCIES ON A DOCUMENT

BACKGROUND

The typical computer system includes at least one processor and a memory device. Executing on the computer system are various types of applications, such as operating system applications and user applications. Typical user applications require that a user enter data into the application. For example, user applications that use forms, such as spreadsheets, databases, web pages, and tax applications are designed around the concept of forms. A form corresponds to any type of document (Hyper-text Markup Language (HTML) page, spreadsheets, etc.) in which functionality is achieved through a combination of fields and calculations. A field in a form stores a data value, which may be supplied by the user (or other outside resource), or calculated using an equation.

Often, the interdependencies in an application are complicated. For example, the interdependencies between fields in a form and the equations used in different fields are often not intuitive to programmers or users. For example, in a tax application, a user may be unable to understand how input in one field relates to input in another field. Specifically, the user may only see the end result of any calculations that are performed.

In order to understand the interdependencies of a document, users (e.g., users of a spreadsheet application) rely on static explanations that are produced by individuals writing the help files. The help files correspond to a snapshot of the description of the application at the time the application is created. Accordingly, the explanation found in the help files is static in nature. Thus, the explanations found in the help file remain static even when the documents that the help files are explaining are dynamic. When modifications are made to the form and a new version of the application is produced, each affected portion of a help file must be updated to ensure the help files are consistent with the form.

SUMMARY

In general, in one aspect, the invention relates to a method for reviewing data dependencies in a document that includes requesting an explanation of a dependent data container in a plurality of data containers, wherein the dependent data container resides within a document, and receiving the explanation of the dependent data container, wherein the explanation that includes information about the dependent data container and information about a precedent data container of the plurality of data containers, and wherein the information describes the dependency between the precedent data container and the dependent data container.

In general, in one aspect, the invention relates to a user interface for explaining a data container that includes a source section that includes a plurality of data containers, and an explanation section that includes an explanation of a dependent data container of the plurality of data containers, wherein the explanation that includes information about the dependent data container and information about a precedent data container of the plurality of data containers, and wherein the information describes the dependency between the precedent data container and the dependent data container.

In general, in one aspect, the invention relates to a system for describing dependencies in a document that includes a user interface configured to receive a request for explaining the dependent data container in a plurality of data containers, wherein the dependent data container resides within the document, and an explanation engine configured to output an explanation of the dependent data container within an explanation section, wherein the explanation that includes information about the dependent data container and information about a precedent data container of the plurality of data containers, and wherein the information describes the dependency between the precedent data container and the dependent data container.

Other aspects of the invention will be apparent from the following description and the appended claims.

DETAILED DESCRIPTION

Figure 1:
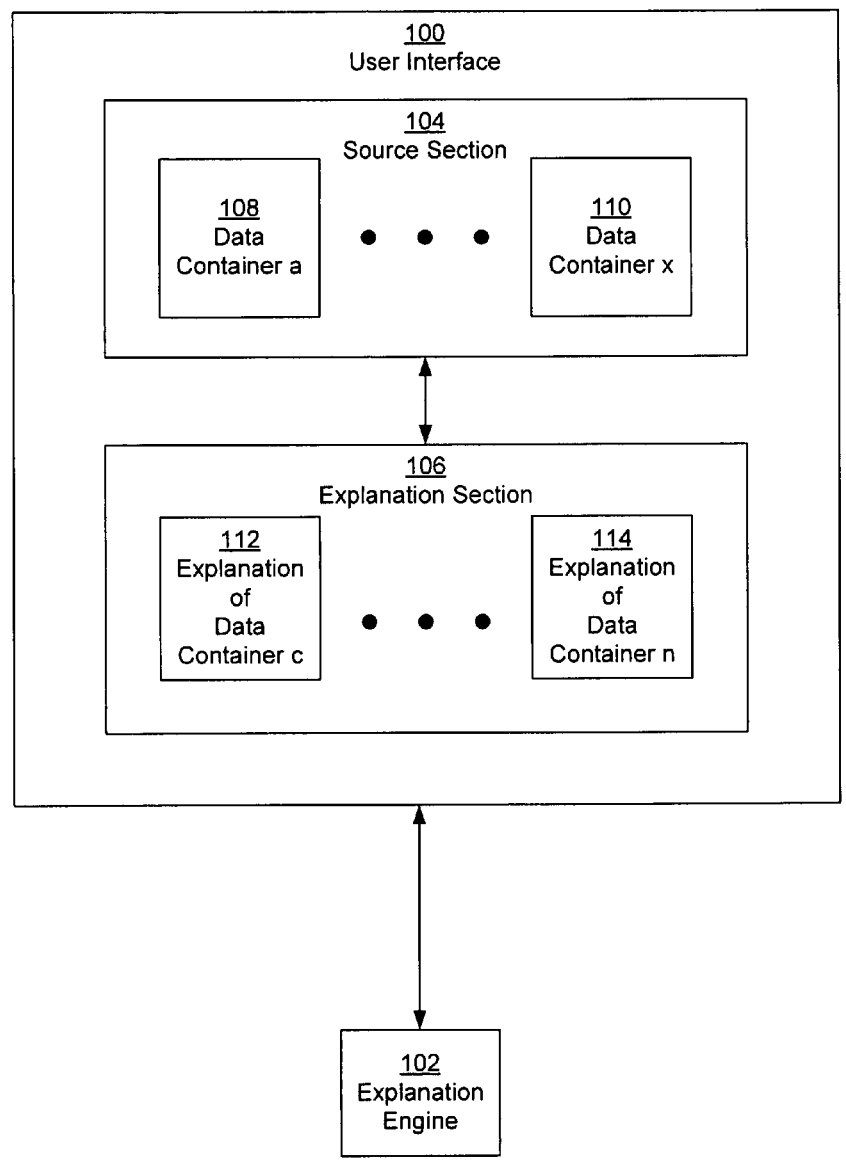
FIG. 1 shows a schematic diagram of a system for describing dependencies in a document in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for describing and reviewing data dependencies in a document. Moreover, embodiments of the invention automatically generate a new and sometimes more natural workflow for the user without having to manually create or maintain help content. In particular, embodiments of the invention dynamically show an explanation of a dependent data container and any precedent data containers upon which the dependent data container depends. A data container corresponds to any portion of a document in which a user may enter data. For example, a data container may correspond to a field, an entry in a table, a cell in a spreadsheet, a word in a document created by a word processing application, a collection of the aforementioned types of data containers (e.g., multiple instances of a field, multiple instances of an entry), etc.

In addition to the explanation of the calculation of the data containers, one or more embodiments of the invention also show the values that a user has entered into a data container. Further, a user may modify the value in the explanation or in the data container when reviewing the explanation. After receiving the modification, one or more embodiments of the invention dynamically recalculate the explanation and update the document to reflect the modification.

FIG. 1 shows a schematic diagram of a system for describing dependencies in a document in accordance with one or more embodiments of the invention. As shown in FIG. 1, the system includes a user interface (100) and an explanation engine (102). Each of these components is described below.

A user interface (100) corresponds to a logical component that allows the user to interact with a user application and an explanation of the data containers (e.g., data container a (108), data container x (110)). The user interface (100) includes a source section (104) and an explanation section (106). The source section (104) corresponds to a document of the user application in which a user enters data. Specifically, the source section (104) corresponds to the document that is to be explained. For example, the source section (104) may correspond to a tax-document, such as a tax return, that contains one or more forms. Accordingly, the document may include one or more views such as windows, screens, tabs, computer generated forms, etc.

When the source section corresponds to document having multiple views, then a view may correspond to multiple instances of the same template. For example, a form may correspond to a form for entering data from an Internal Revenue Service form W-2 that is received from an employer. If a user has worked at multiple jobs over the course of the year, then the user may have several instances of the form for entering data from the W-2.

The source section (104) includes data containers (e.g., data container a (108), data container x (110)) (described above). The data containers (e.g., data container a (108), data container x (110)) may span views on the source section (104). Further, data containers (e.g., data container a (108), data container x (110)) may correspond to dependent data containers and/or precedent data containers.

A dependent data container corresponds to a data container that is dependent on other data containers (e.g., data container a (108), data container x (110)). Inversely, a precedent data container corresponds to a data container that has one or more data containers (e.g., data container a (108), data container x (110)) dependent on it. A data container is dependent on another data container when the value for the data container uses the value of another data container. For example, data container j (not shown) may correspond to a calculated field in which the calculation specifies adding three to data container b (not shown). In such scenario, data container j is a dependent data container and data container b is a precedent data container. A calculation as used herein corresponds to any type of logical expression (e.g., "data container 1=3", "if data container 2=='female', then data container 5=$5000", etc.).

Continuing with FIG. 1, the user interface (100) also includes an explanation section (106). The explanation section (106) corresponds to a portion of the user interface (100) that allows a user to interact with the explanation of one or more data containers (e.g., data container a (108), data container x (110)) on the source section (104). The explanation section (106) may correspond to a separate view of the user interface (100) from the source section (104). In one or more embodiments of the invention, the explanation section (106) includes an explanation of a data container (e.g., explanation of data container c (112), explanation of data container n (114)).

The explanation of the data container (e.g., explanation of data container c (112), explanation of data container n (114)) corresponds to an explanation of how a value in a data container is created. Accordingly, the explanation section includes an explanation of a dependent data container and one or more precedent data containers. An explanation as used herein may not only correspond to a translation of the calculations used to compute the value of a data container, but also to a transformation of the calculations. Specifically, an explanation may include different words and different ordering of the words from a translation. Further, an explanation may include more or fewer words and may add or remove content in order to clarify the meaning for the user thereby resulting in a metamorphosis of content for the user.

For example, suppose the calculation used in DataContainer$_{11}$ states that DataContainer$_{11}$=DataContainer$_1$+DataContainer$_2$+DataContainer$_{13}$+DataContainer$_7$. A translation may state "add the value in DataContainer$_1$ to the value in DataContainer$_2$. Add the value in DataContainer$_{13}$ to the result. Add the value of DataContainer$_7$ to the result. Put the result in DataContainer$_{11}$" In contrast, an explanation of the above calculation may correspond to "Add the values in DataContainer$_1$, DataContainer$_2$, DataContainer$_7$, and DataContainer$_{13}$. Put the result into DataContainer$_{11}$" Thus, as shown in the example, an explanation may provide more intuitive and helpful information to the user.

When explaining the dependency information for a dependent data container, the explanation section (106) may include the dependent data container and the precedent data container in a different order than on the source section (104). Specifically, the order of the explanation of the data containers listed on the explanation section (106) may be in a format more intuitive to the user.

Further, in one or more embodiments of the invention, each explanation of a data container (e.g., explanation of data container c (112), explanation of data container n (114)) may dynamically display the current value in the data container. Specifically, in one or more embodiments of the invention, a user may update the value for a data container on the source section (104) or on the explanation section, (106) and the updated value is propagated to the data container of the opposing section (i.e., the explanation section (106) or the source section (104)). Further, the propagation may also result in the recalculation and update of other data containers on the source section (104) and/or the explanation section (106).

The explanation of a data container (e.g., explanation of data container c (112), explanation of data container n (114)) may also include optional information. Specifically, the optional information may include the actual value that is currently in the data container, the location of the data container (e.g., which instance of a form), whether the data container is empty (i.e., a value is not entered in the data container), whether the data container contains invalid data (i.e., does not conform with the requirements for the data container), whether the data container is able to be calculated, a link to the data container on the source section, code referenced by the calculation, a warning if a detected error exists with the data container (e.g., the data container cannot be calculated or other such errors), etc.

In addition, the data containers that require attention, (e.g., empty data containers, data containers with invalid data, etc.) may have a modified appearance on the explanation section from the data containers that do not require attention. For example, the explanation, or a portion thereof, of a data container that requires attention may be displayed in a different formatting style, highlight, color, etc.

In one or more embodiments of the invention, the explanations of the data containers (e.g., explanation of data container c (112), explanation of data container n (114)) may be displayed on the explanation section (106) in virtually any manner. Specifically, the explanations may be graphical, such as a tree structure with connectivity between explanations showing dependencies, a pictorial, a list, a multi-dimensional interactive structure, etc.

Continuing with FIG. 1, an explanation engine (102) is connected to the user interface (100) in accordance with one or more embodiments of the invention. The explanation engine (102) corresponds to a logical component that includes functionality to create the explanation section (106) with the explanation of the data containers (e.g., explanation of data container c (112), explanation of data container n (114)). Specifically, the explanation engine (102) includes functionality to review the source section (104), identify the dependencies between data containers (e.g., data container a (108), data container x (110)) on the source section (104), and create the explanation of the data container (e.g., explanation of data container c (112), explanation of data container n (114)) with the optional information.

Figure 2:
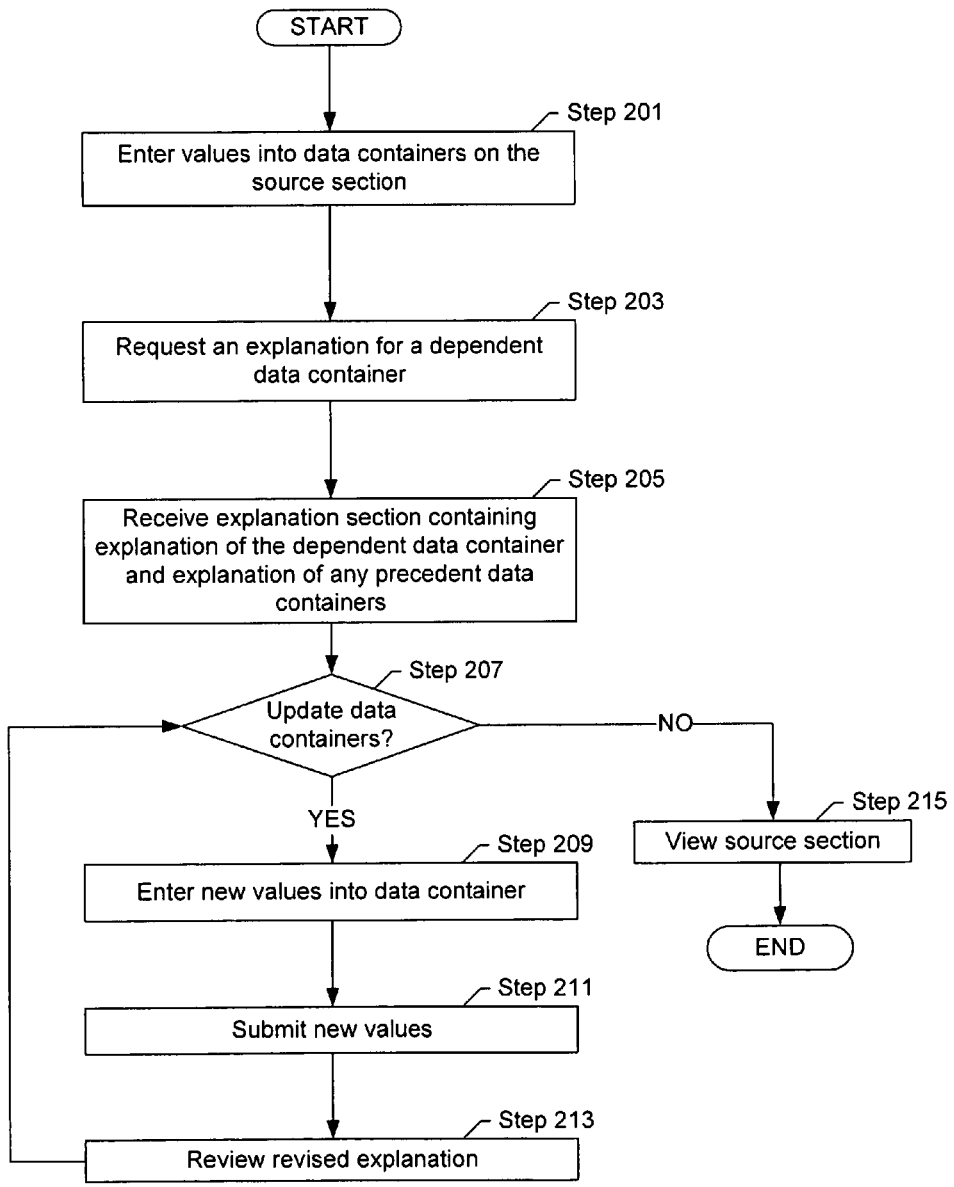
FIG. 2 shows a flowchart of a method for reviewing data dependencies in a document in accordance with one or more embodiments of the invention.

FIG. 2 shows a flowchart of a method for reviewing data dependencies in documents in accordance with one or more embodiments of the invention. Initially, values are entered into data containers on the source section (Step 201) in accordance with one or more embodiments of the invention. Specifically, the user may begin populating the data containers on the source section with data. After or while the user is populating data on the source section, data containers that obtain values through calculations may be calculated. Specifically, the data containers that are calculated may also be populated with values.

Next, an explanation for a dependent data container is requested (Step 203). Requesting an explanation for a dependent data container may be performed, for example, by clicking a button associated with the dependent data container, accessing a menu item and specifying a particular data container, or using virtually any other technique known in the art for requesting an action. Further, at this stage, optional information may also be selected to be displayed.

After requesting an explanation of the dependent data container, an explanation section that contains the explanation of the dependent data container and any precedent data containers is received (Step 205). Specifically, at this stage, the explanation engine performs the necessary calculations to create the explanation section in accordance with one or more embodiments of the invention. The explanation section may be received as a new display, a pop-up window, one or more graphical bubbles overlaid on the source section, etc.

Once the explanation section is received, a user may review the information data dependencies between different data containers that are on the source section. While reviewing the data dependencies, the user may decide to update the value in the data containers. Thus, a determination is made whether to update the data containers (Step 207).

If the data containers are to be updated, then a new value is entered into the data container (Step 209). In one or more embodiments of the invention, a new value may be entered into a data container on the source section or the explanation section. Specifically, if a value exists in the data container, then the value may be changed. Alternatively, if a value does not exist in the data container, then the value may be added.

Further, a new value may be entered into a data container regardless of whether the data container is calculated. Specifically, a data container that is calculated may be entered with a value. Thus, when entering a dependent calculated data container with a value, a user may determine which values are required in the precedent data container(s) to achieve the resultant value that the user entered. Alternatively, in one or more embodiments of the invention, entering a value in a calculated data container merely overrides the calculation and no changes are made to the precedent data containers.

Next, the new value is submitted (Step 211) in accordance with one or more embodiments of the invention. At this stage, the user may click on a button or use another such command to indicate a request to update the value in the calculations. Thus, the explanation engine may recalculate the dependent data container and output a new explanation section. When submitting the new value, in one or more embodiments of the invention, the update on the new value may be propagated throughout the source section and the explanation section. Specifically, any calculations that use the new value may be recalculated on both the source section and the explanation section.

Alternatively, rather than submitting the new value and having the calculations on the source section recalculated from the new value, the new value may be submitted as a temporary value in accordance with one or more embodiments of the invention. Specifically, a user may enter the new value to understand how the new value would affect the dependent data container. Once the user accepts the new value, the user may finalize the new value by having the new value propagated to the source section in accordance with one or more embodiments of the invention.

After the new value is submitted, then a revised explanation is reviewed (Step 213). After reviewing the revised explanation, then a determination is made whether to update the values in the data containers (Step 207). If the user determines not to update the values in the data containers, then the source section may be viewed (Step 215) in accordance with one or more embodiments of the invention. In particular, the user may continue entering values or performing various tasks with the source section.

Figure 3:
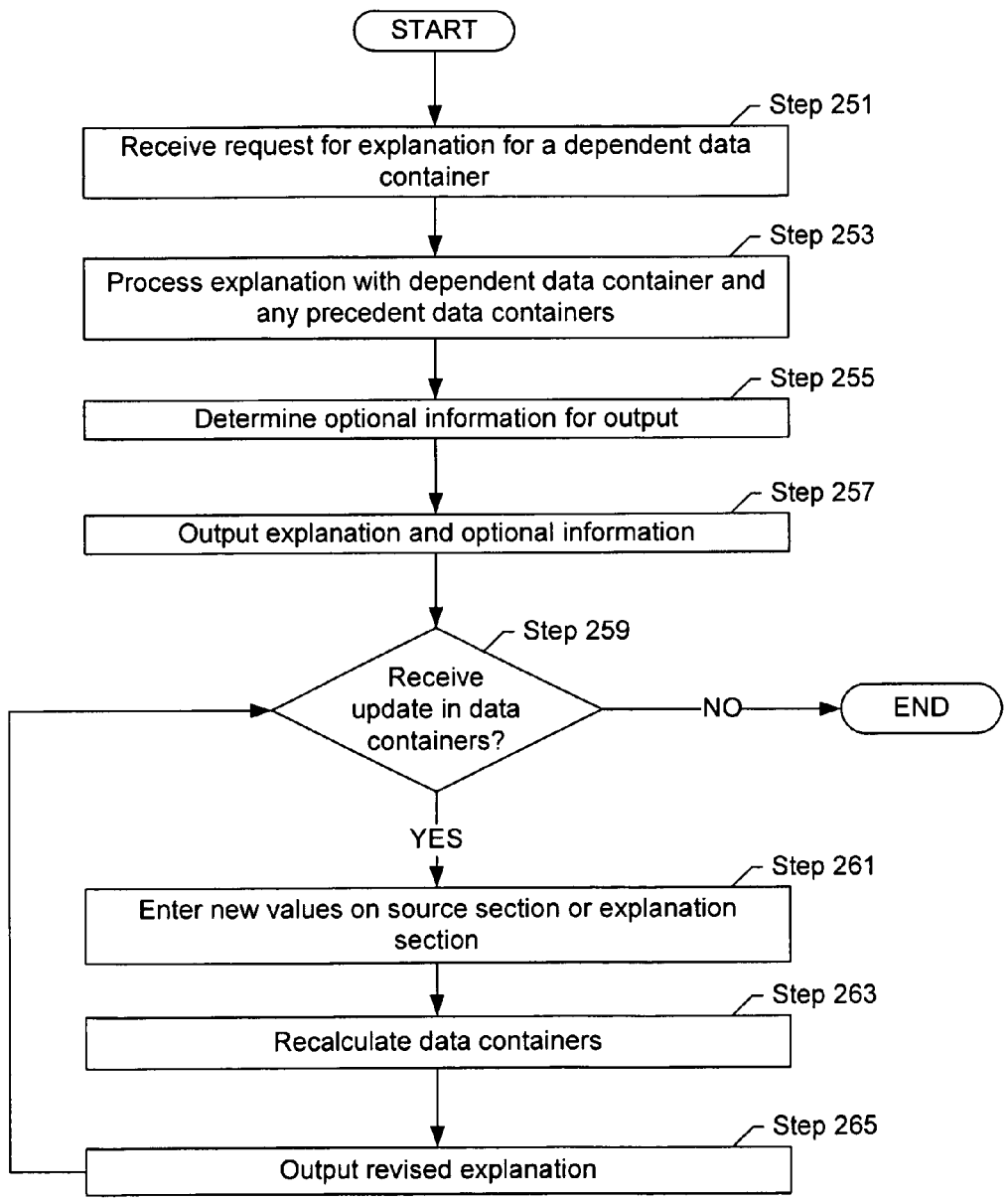
FIG. 3 shows a flowchart of a method for describing data dependencies in a document in accordance with one or more embodiments of the invention.

FIG. 3 shows a flowchart of a method for describing data dependencies in a document in accordance with one or more embodiments of the invention. Initially, a request is received for the explanation for a dependent data container (Step 251). The request may include an indication of which data container requires the explanation and a request for optional information.

Next, the explanation is processed with the dependent data container and any precedent data container upon which the dependent data container depends (Step 253). Specifically, the precedent fields are identified and an explanation is created for each precedent field and dependent field. Multiple mechanisms exist that can be used to transform code associated with the data containers and used to create the document into explanations for the explanation section. One method for creating the explanations is described in patent application Ser. No. 11/439,362 which is incorporated herein by reference.

One method for creating the explanations is for a developer of the user-application to create the explanation for each data container. The developer may also specify dependencies that exist between data containers, such as in a dependency tree. During runtime, the explanation engine may analyze the dependency tree and identify the dependencies between the runtime data containers, including multiple repeat dependencies created by multiple instances of the same template.

For example, the developer for an application to file taxes may develop forms that are similar to the Internal Revenue Service (IRS) forms and can be filled in by a user. When developing the forms, the developer may specify that a data container specifying "wages" on the IRS 1040 form is dependent on a data container "wages" of the IRS W-2 form. The explanation engine may identify multiple instances of the W-2 form that a user has created. Subsequently, the explanation engine creates the explanation section that has an explanation for the "wages" data container for each instance of the W-2 form and the "wages" on the 1040 form in accordance with one or more embodiments of the invention. Thus, dependency information on the explanation section may link the multiple instances of the "wages" data container on the W-2 form with the single instance of the "wages" data container on the 1040 form in accordance with one or more embodiments of the invention.

Another method for creating the explanations is for the explanations to be processed automatically from the code used to create the document. For example, the code for each data container may be extracted from the code used to create the document. Then the code for each data container may be analyzed to create a dependency tree. Specifically each node in the dependency tree corresponds to the code for a data container. The aforementioned steps may be performed at runtime, compile time, etc. If the dependency tree is a compile-time dependency tree, then a runtime dependency tree may be created from the compile-time dependency tree when the user requests the explanation of the dependent node.

In one or more embodiments of the invention, any runtime dependency tree may only include nodes corresponding to the dependent data container that the user requests and any precedent data containers. The nodes in the runtime dependency tree may also include multiple instances of precedent data containers (e.g., if the precedent data container corresponds to a "wages" data container on a W-2 form). The runtime dependency tree may subsequently be reduced using a set of reduction rules, ordered according to a manner deemed intuitive to the user, and transformed into explanations using templates associated with the type of node.

A mapping rule repository corresponds to a storage unit (e.g., a table, database, listing, etc.). The mapping rule repository includes rules for mapping each operator and parameter into a classification of a type of object. For example, in one or more embodiments of the invention, the "+", "−", "*" operators maps to arithmetic objects. As another example, an AST node describing a field (e.g., "field_2"), may have an entry in the mapping rule repository that specifies a field name maps to a "DSfieldRef" object.

Figure 6:
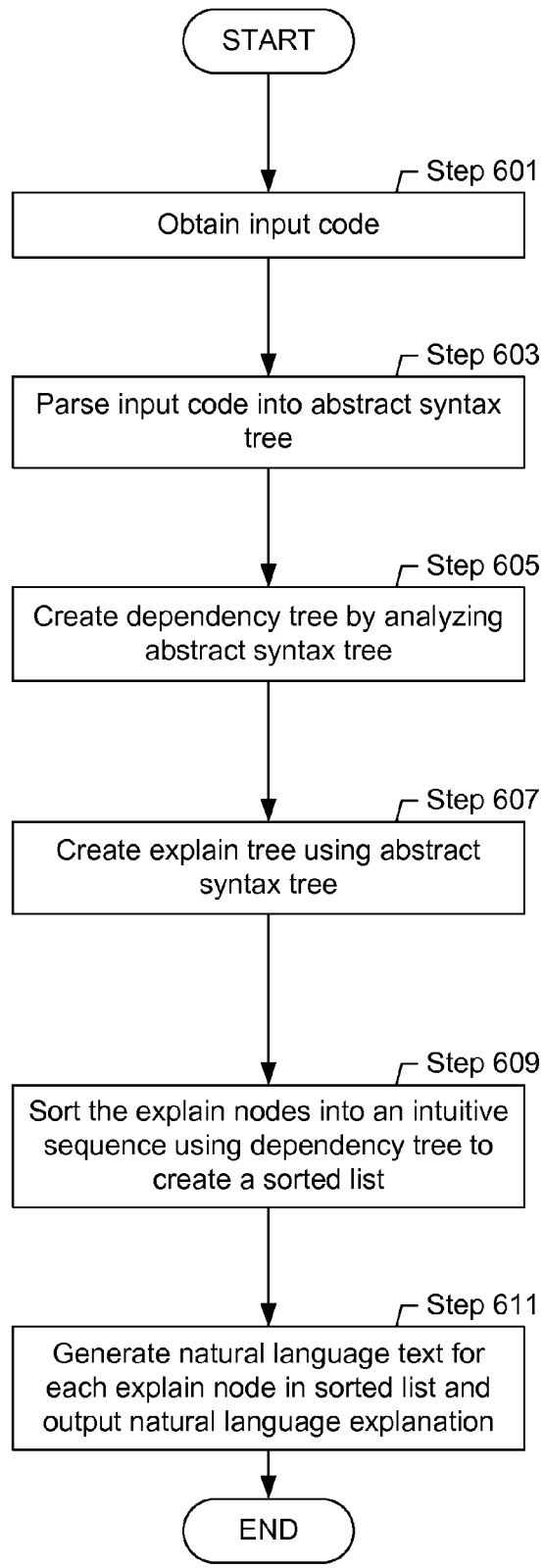
FIG. 6, FIG. 7, FIG. 8, and FIGS. 9A-9B show flowcharts in accordance with one or more embodiments of the invention.

FIG. 6 shows a flowchart of a method for converting input code into a natural language explanation in accordance with one or more embodiments of the invention. Initially, the input code is obtained (Step 601). Obtaining the input code can be performed in a variety of ways known in the art. For example, the input code or a link may be obtained by a user or program using a user interface, an application programming interface, etc. The input code that is obtained may correspond to a part or all of an application. For example, because a user may specify that only a portion of the application should be translated, the input code that is obtained may correspond to the portion that should be translated.

After the input code is obtained, the input code is parsed to obtain an abstract syntax tree (Step 603). Parsing the input code into the abstract syntax tree may be performed by a compiler using virtually any method known in the art. Those skilled in the art will appreciate that rather than creating the abstract syntax tree, the abstract syntax tree may be a by-product of a third party compiler. In either scenario, the abstract syntax tree is obtained.

Once the abstract syntax tree is obtained, the abstract syntax tree is analyzed to create a dependency tree (Step 605). Creating the dependency tree can be performed for example, by identifying the nodes that have an assignment operator in the abstract syntax tree. For each assignment node, the field name that is the object of the assignment operator becomes a newly-created dependency node in the abstract syntax tree. Field name(s) that correspond to parameters of the assignment operator become parents of the newly created node in accordance with one or more embodiments of the invention.

Figure 7:
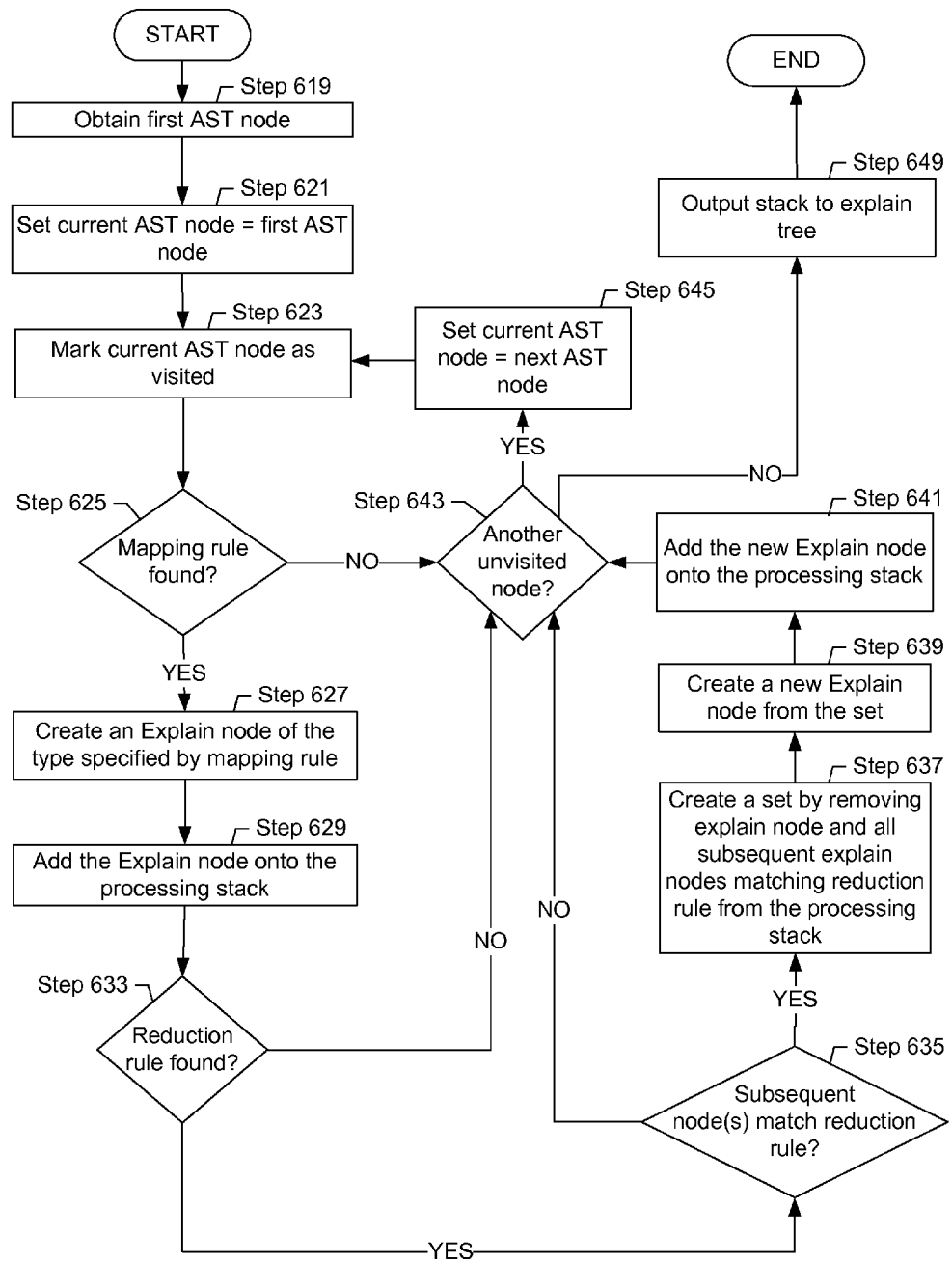

In one or more embodiments to the invention, in addition to the dependency tree, an explain tree is created using the abstract syntax tree (Step 607). Those skilled in the art will appreciate that the explain tree may be created before, during, or after the dependency tree is created. In one or more embodiments of the invention, the explain tree is created by applying the mapping rules to the syntax nodes in the abstract syntax tree to create explain nodes and reducing the newly created explain nodes. FIG. 7 shows a flowchart of a method for creating an explain tree in accordance with one or more embodiments of the invention.

As shown in FIG. 7, the first AST node is obtained (Step 619). The first node is typically a leaf node from the abstract syntax tree. Specifically, in accordance with one or more embodiments of the invention, creating the dependency tree from the abstract syntax tree is performed by performing a post order traversal of the abstract syntax tree. In a post order traversal, the children AST nodes are visited before the parent AST nodes. Further, in one embodiment of the invention, the order of visiting the children AST nodes may be determined by the order of the children AST nodes in the input code. For example, if the equation is "3+5", then the AST node representing "3" is visited. Next, the AST node for "5" is visited. Finally the AST node for "+" is visited. Those skilled in the art will appreciate that other traversals of the abstract syntax tree are also possible. Specifically, with modifications to algorithm, virtually any traversal of the abstract syntax tree may be used.

Continuing with FIG. 7, after obtaining the first AST node, the first AST node is set to be the current AST node (Step 621). The current AST node is then marked as visited (Step 623). Marking an AST node as visited may be performed by changing the value of a Boolean variable associated with the AST node. Next, a determination is made whether a mapping rule is found for the current AST node (Step 625). Determining whether a mapping rule is found may be performed by searching the mapping rule repository for the type of the AST node. Searching the mapping rule repository may be performed, for example, by a simple lookup in a table, performing a hash operation on the type of AST node, or other means known in the art. If a mapping rule does not exist for the current AST node, then in one or more embodiments of the invention, the current AST node is ignored and a determination is made whether another unvisited AST node exists (Step 643).

Alternatively, if a mapping rule is found for the current AST node, then an explain node of the type specified by the mapping rule is created (Step 627). Specifically, an object of the type specified in the mapping rule is instantiated with the data in the AST node as a member variable. For example, in one or more embodiments of the invention, if "field_1" is the current AST node, then an object of type DSfieldref is created with member variable "field_1". By maintaining the member variable, classification of AST nodes may be performed without loss of information.

After creating an explain node using the mapping rules, the created explain node is added to a processing stack (Step 629). Specifically, in one or more embodiments of the invention, the explain node is added to the top of the processing stack.

Next, a determination is made whether a reduction rule is found for the explain node (Step 633). Determining whether a reduction rule is found for the explain node may be performed by a lookup in the reduction rule repository for the explain node. If a reduction rule is not found for the explain node then a determination is made whether another unvisited AST node exists (Step 643).

Alternatively, if a reduction rule is found for the current explain node, then a determination is made whether subsequent nodes in the processing stack of the current explain node match the reduction rule (Step 635). Specifically, the explain node(s) underneath the current explain node is examined to determine whether the node matches the reduction rule. More specifically, the explain nodes that match the reduction rule can only be contiguous on the stack in accordance with one or more embodiments of the invention. If the subsequent nodes of the current explain node do not match the reduction rule, then a determination is made whether another unvisited AST node exists (Step 643).

Alternatively, if the subsequent nodes match the reduction rule, then a set is created by removing the current explain node and the subsequent explain nodes that match the reduction rule from the processing stack (Step 637). In particular, the set includes the removed explain nodes. Next, a new explain node is created from the set (Step 639). Specifically, the removed subsequent explain nodes are set as member variables of the current explain node.

After resetting the children explain nodes, a determination is made whether another unvisited node exists in the abstract syntax tree (Step 643). Determining whether another unvisited node exists may be performed by determining whether the current node is the root of the abstract syntax tree. If the current node is the root of the abstract syntax tree, then all nodes have been visited in accordance with one or more embodiments of the invention.

Accordingly, the processing stack is outputted to create the explain tree (Step 649). In one or more embodiments of the invention, outputting the processing stack may be performed by iteratively removing each explain node from the processing stack and adding the removed explain node to the end of the explain tree. In one or more embodiments of the invention, the outputted explain tree corresponds to a list of explain nodes corresponding to assignment objects. In particular the reduction rules reduce the explain nodes to assignment nodes in accordance with one or more embodiments of the invention.

Alternatively, if the current node is not the root of the abstract syntax tree, then the current AST node has a parent. Because the abstract syntax tree is traversed with a post order traversal, the parent AST node of the current AST node is unvisited in accordance with one or more embodiments of the invention. Thus, a determination is made whether the parent AST node of the current AST node has any unvisited children. If the parent AST node has unvisited children, then one of the unvisited children is set as the current AST node (Step 645). Alternatively, if all children of the parent node are visited, then the parent AST node is set as the current AST node (Step 645). After setting an AST node as the current AST node, the current AST node is mark as visited (Step 623). When all nodes are visited, then the explain tree is complete.

Those skilled in the art will appreciate that while FIG. 7 describes a stack implementation for transforming the AST nodes into explain nodes, other implementations may also be used. For example, rather than adding explain nodes to the processing stack, the explain nodes may be added to the top of the explain tree directly.

In the tree implementation, reduction rules are applied to subtrees of the explain tree to determine whether the subtrees may be transformed into a representation more suitable for natural language translation. If the children match the reduction rule, then the children explain nodes are added as member variables to the current explain node. The children of the children explain nodes are then set as children of the current explain node.

Figure 8:
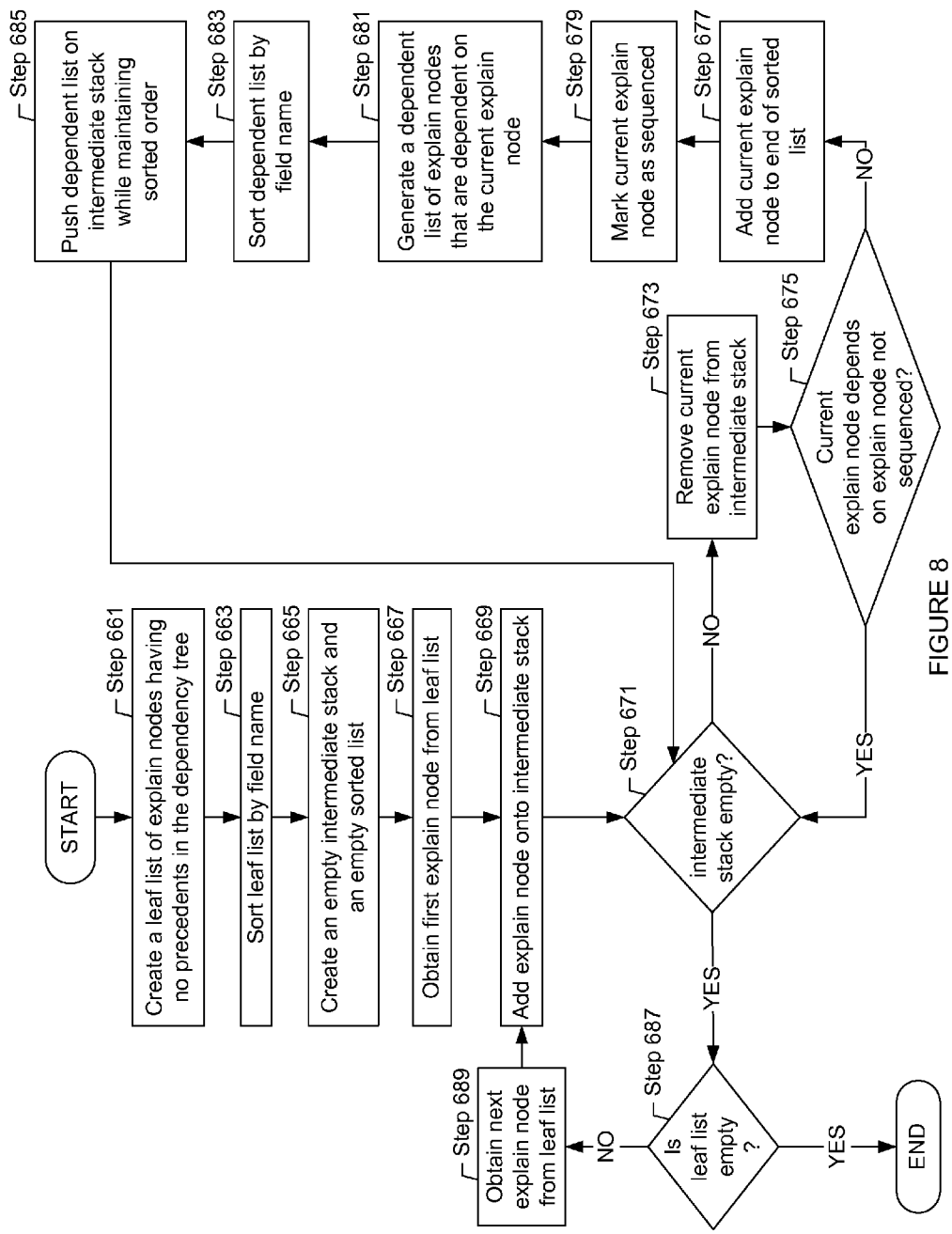

Returning to FIG. 6, after creating the explain tree, the explain nodes in the explain tree are sorted into an intuitive sequence using the dependency tree to create a sorted output list (Step 609). FIG. 8 shows a flowchart of a method for performing a topological sort of explain nodes in the explain tree in accordance with one or more embodiments of the invention.

As shown in FIG. 8, initially a leaf list of explain nodes that do not have precedents in the dependency tree are created (Step 661). One method for creating the leaf list is to determine which nodes in the dependency tree do not have children. The leaf list may be created by traversing the dependency tree. When a dependency node is determined to not have children, then the explain node in the explain tree that corresponds to the field reference is added to the leaf list.

Continuing with FIG. 8, the leaf list is sorted by field name (Step 663). Specifically, as previously discussed, the reduction rule has removed non-assignment explain nodes and set the non-assignment explain nodes as member variables of the assignment explain nodes. Therefore, the explain tree has only assignment explain nodes in accordance with one or more embodiments of the invention. Accordingly, the leaf list may be sorted by the member variable specifying the field name corresponding to the assignment operator.

After sorting the leaf list by field name, an empty intermediate stack and empty sorted list is created (Step 665). Next, the first explain node from the leaf list is obtained (Step 667). Then, the first explain node is added (e.g., pushed) to the intermediate stack (Step 669). After adding the first explain node to the stack, a determination is made whether the intermediate stack is empty (Step 671).

If the stack is not empty, then the first explain node is removed (e.g., popped) from the intermediate stack and set as the current explain node (Step 673). Next, a determination is made whether the current explain node depends on a precedent explain nodes not sequenced (Step 675). Determining whether the current explain node depends on at least one precedent explain node not yet sequenced may be performed by traversing the dependency tree and determining whether all dependency nodes that are children of the dependency node with the field name of the current explain node are marked as sequenced. If the current explain node does not depend on any precedent explain node not yet sequenced, then the current explain node is added to the end of the sorted list (Step 677).

Next, the current explain node is marked as sequenced (Step 679). In one or more embodiments of the invention, the dependency node that field name corresponds to the current explain node is marked as sequenced. Marking an explain node may be performed by changing a Boolean variable associated with the explain node or dependency node to "true".

After marking the current explain node as sequenced, a dependent list of explain nodes is generated (Step 681). The dependent list of explain node corresponds to the list of explain nodes that are dependent on the current explain node. The dependent list of explain nodes may be obtained by aggregating the field names of all direct and indirect dependents of the current explain node. The field name may then be used to obtain the explain nodes from the explain tree.

After obtaining the dependent list, the dependent list is sorted by the field name (Step 683). Specifically, the member variables corresponding to the field name are used to sort the dependency list.

Alternatively, the order of the dependency nodes may be maintained. For example, the explain node that corresponds to the dependency node at the root of the tree may be in the front of the dependent list, while the explain node(s) that is directly dependent on the current explain node is added to the end of the list.

Next, the set of explain nodes are added to the intermediate stack while maintaining the order specified in the tree (Step 685). For example, the first explain node in the dependency list is added to the intermediate stack first and the last explain node in the dependency list is added to the intermediate stack last in accordance with one or more embodiments of the invention.

After adding the dependency list to the intermediate stack, a determination is made whether the stack is empty (Step 671). The stack is typically empty when the current explain node is the root of the tree.

If the stack is not empty, then the method continues with the removing the next explain node from the stack and setting the next explain node as the current explain node (Step 673). Alternatively, if the stack is empty, then a determination is made whether the leaf list is empty (Step 687). If the leaf list is not empty, then more un-sequenced leaf explain nodes exist. Accordingly, the next explain node is obtained from the leaf list (Step 689). After obtaining the next explain node from the list, the next explain node is added to the stack (Step 669).

Alternatively, if the list is empty, then all of the explain nodes in the dependency tree are sequenced into a sorted list.

Those skilled in the art will appreciate that while FIG. 8 describes one method for sorting the explain nodes, other methods are also possible. Specifically, a different sorting algorithm may be used. The actual sorting algorithm that is used may be based on the type of ordered output list that is intuitive to the type of user. For example, if the type of user is a programmer, then an ordering that is intuitive may be based on the order of the equations as stated in the design of the form. Specifically, in the programmer example, explain nodes are near the explain nodes on which they are dependent. Alternatively, if the type of user is an application user, then the ordering that is intuitive may be based on the order of the field names as they are presented visually to the user. Specifically, in the application user example, the order may correspond to field__1, field__2, field__3, etc.

Figure 9A:
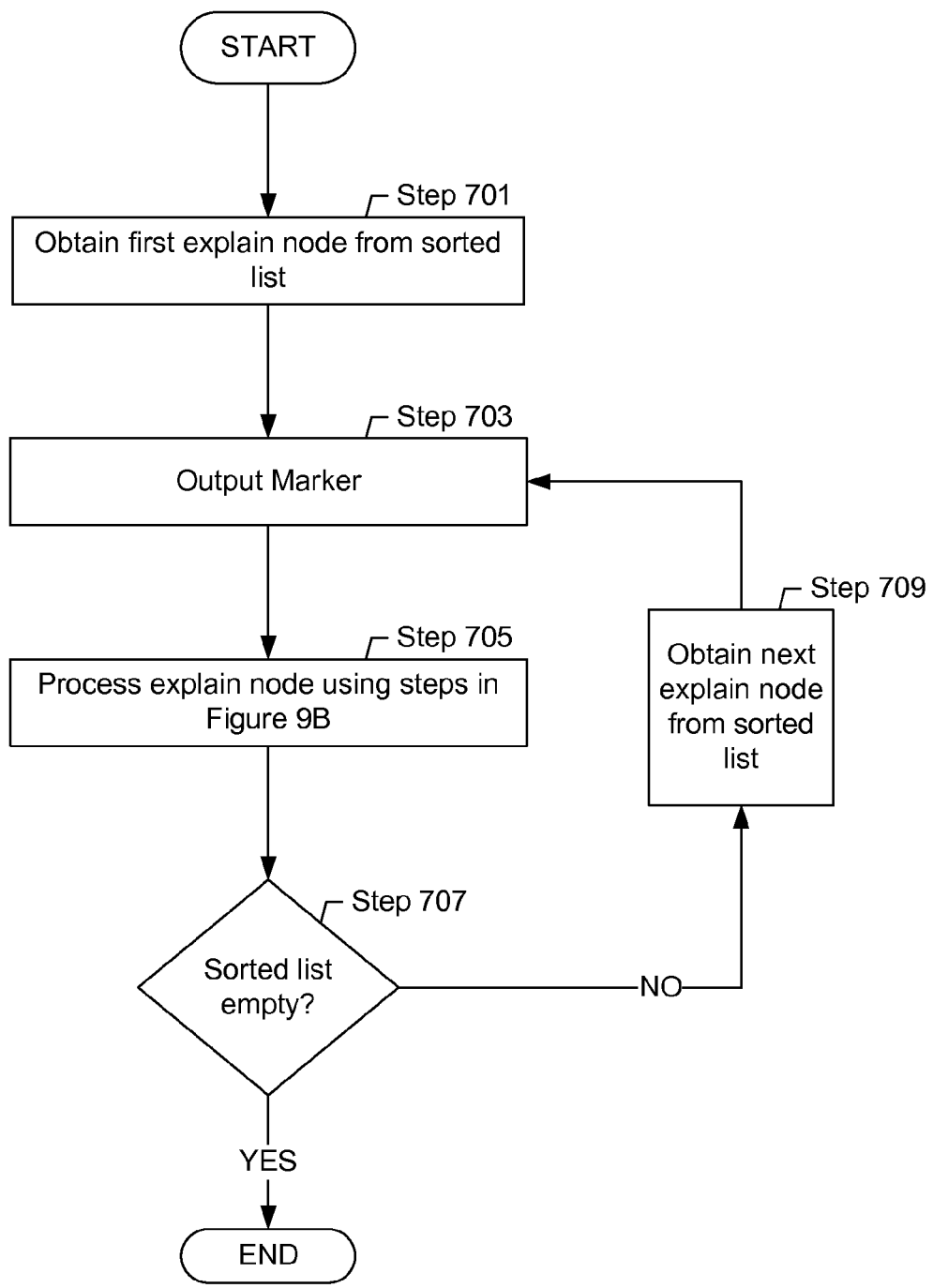
Figure 9B:
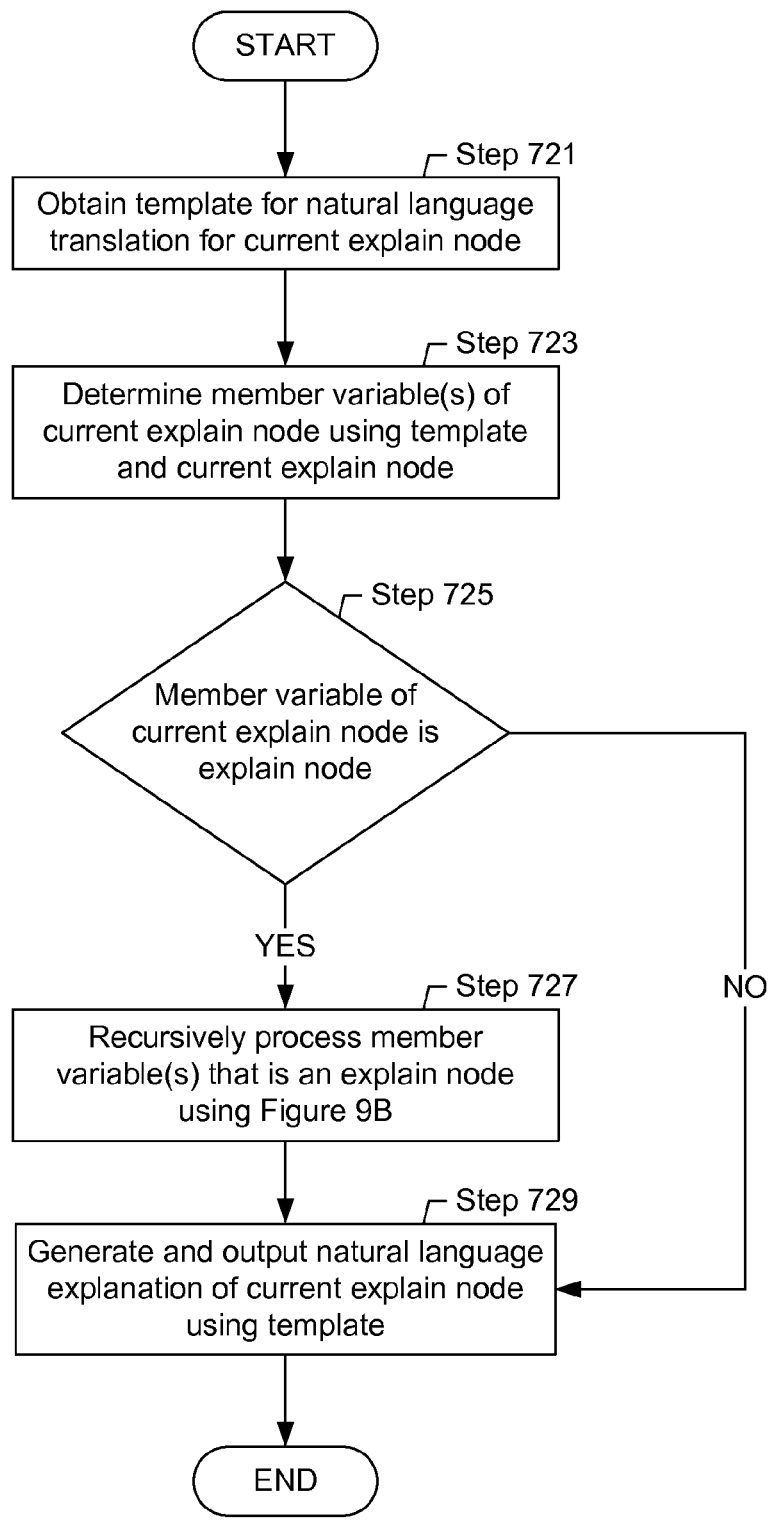

Returning to FIG. 6, after the sorted list is created, then a natural language explanation is generated for each explain node in the sorted list and the natural language explanation is outputted (Step 611). FIGS. 9A-9B show a flowchart of a method for generating natural language explanation of explain nodes in accordance with one or more embodiments of the invention. Specifically, FIG. 9A shows the steps of traversing the sorted list in accordance with one or more embodiments of the invention.

Initially, the first explain node is obtained from the sorted list (Step 701). Next, a marker is outputted (Step 703). The marker indicates that the equation (s) specified after the marker is for a specific field. Those skilled in the art will appreciate that outputting the marker is optional.

Next, the explain node is processed using the steps described in FIG. 9B. FIG. 9B shows a method for processing an explain node to generate a natural language explanation in accordance with one or more embodiments of the invention. For the purposes of FIG. 9B, the current explain node corresponds to the explain node currently being processed.

Initially, a template for the natural language explanation of the current explain node is obtained (Step 721). The template may be obtained, for example, by accessing the natural language repository. In one or more embodiments of the invention, the natural language repository has a single template that matches the explain node with the member variables of the explain node.

After obtaining the template, the member variables of the current explain node are determined using the template and the current explain node (Step 723). The member variables are the member variables of the current explain node. Next a determination is made whether any of the member variables correspond to an explain node (Step 725). Specifically, a determination is made whether the current explain node has nested explain nodes as member variables.

If the current explain node does have explain nodes as member variables, then the explain nodes that are member variables of the current explain node are recursively processed using the steps of FIG. 9B (Step 727). Specifically, each nested explain node is processed in order recursively using FIG. 9B. Those skilled in the art will appreciate that while FIG. 9B shows a recursive algorithm for processing an explain node, an iterative algorithm may also be used.

Once the member variables corresponding to explain nodes are processed or if no member variables exist that correspond to explain nodes, then the natural language explanation of the current explain node is generated and outputted using the template (Step 729). Specifically, the template specifies the filler words and the member variables specify the variable data to apply between the filler words in accordance with one or more embodiments of the invention.

Returning to FIG. 9A, once the natural language explanation is generated for the explain node in the sorted list, then a determination is made whether the sorted list is empty (Step 707). If the sorted list is not empty, then the next explain node is obtained from the sorted output list (Step 709). Alternatively, if the sorted output list is empty, then the natural language explanation is generated for all explain nodes.

Those skilled in the art will appreciate that the natural language explanation may be outputted by adding the natural language explanation to a file, printer, display, etc. Further, outputting the natural language explanation may be performed during or after generating the natural language explanation.

Those skilled in the art will appreciate that innumerable methods exist for implementing the natural language translation in accordance with one or more embodiments of the invention. Specifically, the aforementioned methods may be modified to improve performance using optimization principles known in the art.

Regardless of the method that is used to create the explanation of each data container on the explanation section, the optional information for the output may also be determined at this stage in accordance with one or more embodiments of the invention (Step 255). Specifically, the optional information that a user desires may be determined. The optional information may be specified in the request, specified as defaults, etc.

Next, the explanation and the optional information are outputted in accordance with one or more embodiments of the invention (Step 257). In particular, the explanation section is created and displayed for the user to view.

After displaying the explanation, a determination is made whether an update in the data containers is received (Step 259). At this stage, the user may have added a new value or changed an existing value to a new value in one or more data containers.

If an update to the data containers is received, then the new value is automatically or manually entered onto the source section or the explanation section (Step 261). Specifically, the opposing section is updated with the new value in accordance with one or more embodiments of the invention.

After updating the opposing section, the data containers are recalculated (Step 263). In one or more embodiments of the invention, recalculating the data containers may be performed by identifying the data containers that are dependent on the data container that has the new value. Only the dependent data containers may be recalculated. Alternatively, the data containers throughout the document may be recalculated.

Once the data containers are recalculated, then a revised explanation is outputted (Step 265). Outputting the revised explanation may correspond to updating the current values on the explanation section to reflect the recalculated values. Further, the explanation may be re-processed to reflect the new values (as described above in step 253). Once the revised explanation is outputted, then a determination is, made whether an update in the data containers is received (Step 259).

While FIG. 2 and FIG. 3 show flowcharts of methods for reviewing and explaining dependencies in a document, various other methods may also be used. For example, in one or more embodiments of the invention, the user may be presented with the explanation section when highlighting or clicking on a data container on the source section. In such embodiments of the invention, the request for the explanation may be implicit by a user accessing the document or a data container on the document.

In the following example, consider the scenario in which a user is using an online tax program in order to file taxes. For the purposes of the example, the document corresponds to all of the forms required for the user's taxes, and the data containers correspond to the fields on the forms. However, the terms "data containers" and "document" are not limited to the use in this example.

Figure 4A:
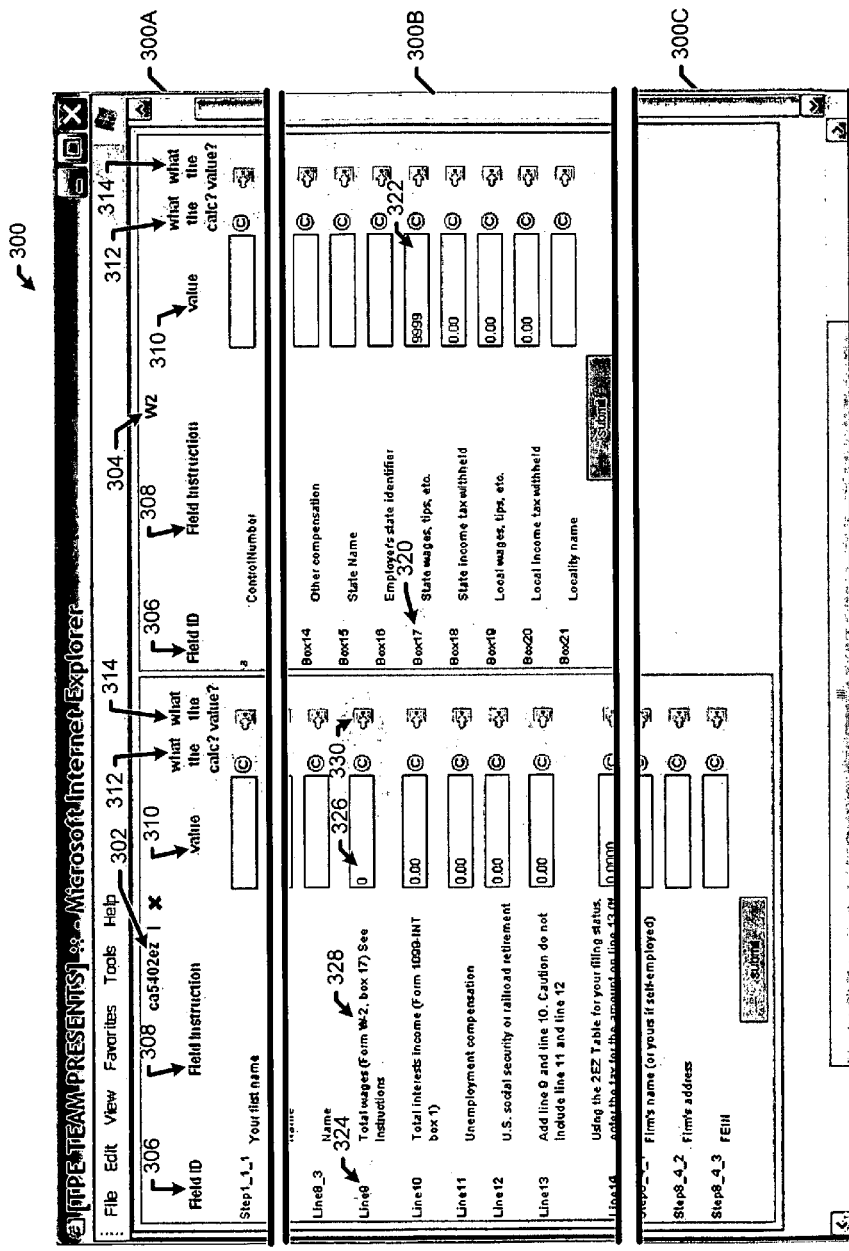
FIGS. 4A-4C shows an example user interface for reviewing data dependencies in a tax document in accordance with one or more embodiments of the invention.
Figure 4B:
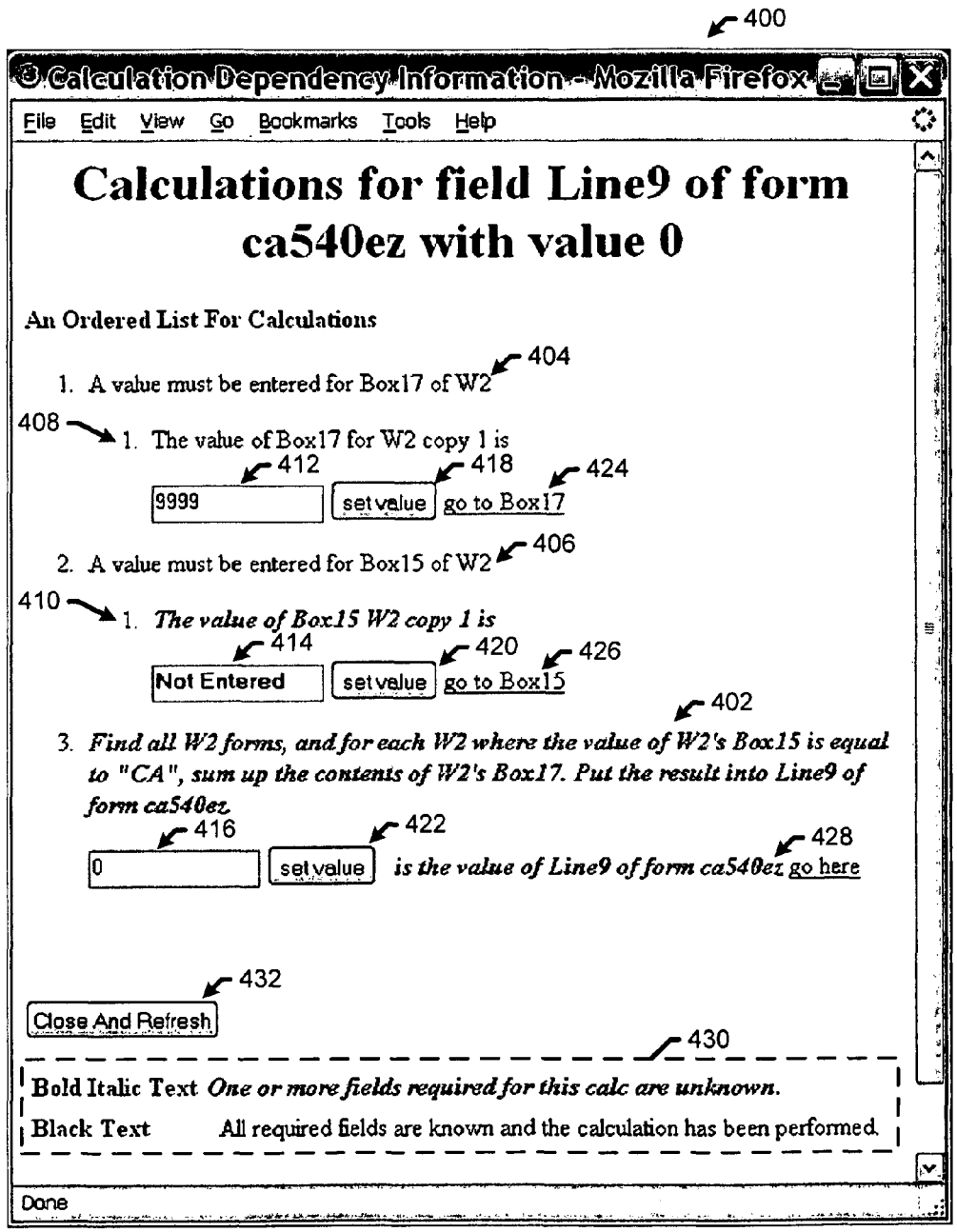
Figure 4C:
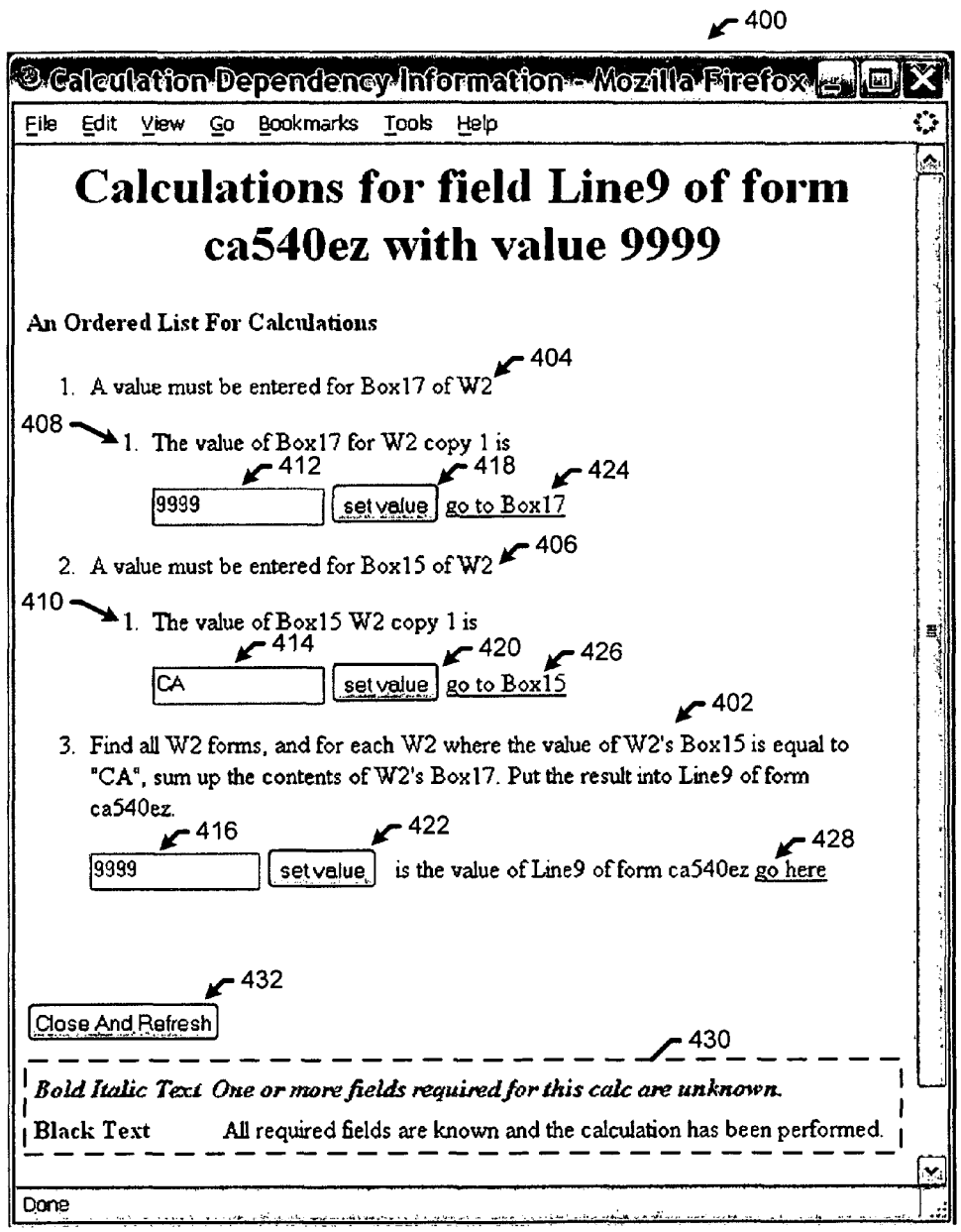

FIGS. 4A-4C shows an example user interface for reviewing data dependencies in a tax document in accordance with one or more embodiments of the invention. Specifically, FIG. 4A shows an example source section (300). Because the forms on the source section (300) are large, the source section (300) is divided into sections (i.e., the top section (300A), middle section (300B), and bottom section (300C)). In the example, the middle section (300B) corresponds to a continuation of the top section (300A). Similarly, the bottom section (300C) corresponds to a continuation of the middle section (300B).

In the example shown in FIG. 4A, a user is filing income taxes in California. Accordingly, the source section (300) shows a ca5402ez form (302) and a W2 form (304). The ca5402ez form (302) corresponds to a portion of an application that simplifies entering data on a California resident income tax return form 5402EZ. Accordingly, certain fields on the ca5402ez form (302) may be calculated. The W2 form (304) on the source section corresponds to a portion of an application for entering data from the IRS W2 form that is received from an employer.

Continuing with the example, both forms (i.e., ca5402ez (302) and W2 (304)) have a field ID column (306), a field instruction column (308), a value column (310), a column entitled "What the calc?" (312), and a column entitled "What the value?" (314). The field ID column (306) uniquely identifies the line on the form (e.g., ca5402ez (302), W2 (304)). The field instructions column (308) presents basic instructions for entering data in the corresponding field. The value column (310) has the data containers for populating the fields with values. A certain portion of the fields in the values column are calculated. The column entitled "What the calc?" (312) allows a user to click on a button associated with the field to see the calculation used to calculate the field. The column entitled "What the value?" (312) allows a user to click on a button associated with the field to request an explanation of the dependencies for the field.

Thus, in the example, the user enters data from the IRS W2 form that the user received from their employer onto the W2 form (304) on the source section. Specifically, the user enters a value of "9999" into the field (322) of Box 17 (320). The user may then notice the value of the field (326), "Line9" (324), remain as "0." Further, the instructions (328) on line 9 (324) indicate that the value in the field (326) should change. Accordingly, the user clicks a button (330) for line 9 (324) in the "What the value" column (314).

Thus, an explanation section is produced to explain the value (326) for line 9 (324) of the source section (300). FIG. 4B shows an example of the explanation section (400) in the user interface in accordance with one or more embodiments of the invention. In the example, the user is guided through the calculations for line 9 on the ca5402ez form. Specifically, not only is the user able to read an explanation of the calculation of line 9 (402), but the user is also able to read an explanation of the precedent fields (e.g., explanation of Box 17 (404), explanation of Box 15 (406)).

Thus, reading the explanation of line 9 (402), the user learns line 9 contains the sum of the values of Box 17 the instances of the W2 form that have box 15 set to "CA." The explanation for the precedent data containers (e.g., explanation of Box 17 (404), explanation of Box 15 (406)) states that a value must be entered for Box 17 of W2 and for Box 15 of the W2 form, respectively. Further, for each instance of the precedent data containers, a separate statement as to the current value is displayed (i.e., (408), (410)). Thus, if the user had multiple W2 forms, then each instance of Box 17 and Box 15 on the multiple W2 forms would be displayed. Further, as shown below in the key (430) of the explanation section (400), bold italic text indicates that the fields required for the calculation are unknown. Thus, the explanation for line 9 (402) and Box 15 (410) are in bold, italic text. The text may alternatively be highlighted, colored a different color, etc.

In addition to the explanation, the user has the opportunity to view and update the current value in the fields on the explanation section. Specifically, the user may change the value of Box 17 using the field (412). Once the user enters a new value, the user may click a "set value" button (418) to recalculate all of the fields. Alternatively, the user may click on a link (424) to be directed to the box 17 on the source section (shown in FIG. 4A).

For the purposes of this example, suppose the user changes the value in the field (414) for Box 15 on the explanation section (400). Once the user changes the value, the user may click on the "set value" button (420) next to the field (414). FIG. 4C shows an example explanation section (400) after the user updates the value in field (414) to "CA" in accordance with one or more embodiments of the invention. As shown in FIG. 4C, the explanations for Box 15 (410) and line 9 (402) are no longer in a modified style (i.e., in bold italic text). Further, a value is now entered into the field (416) of line 9 to reflect the new calculations.

In addition, if the user clicks on the link to be navigated to box 15 (426), then the user would see the value updated on the source section in accordance with one or more embodiments of the invention (not shown). Alternatively, the user may click on the close and refresh button (432) to be directed back to the source section that is updated with the user's modifications on the explanation section (400).

As shown in the example, the explanation section provides a simple method for a user to understand the data dependencies in the document. Further, the user may update and navigate through the different fields on the source section and the explanation section.

Figure 5:
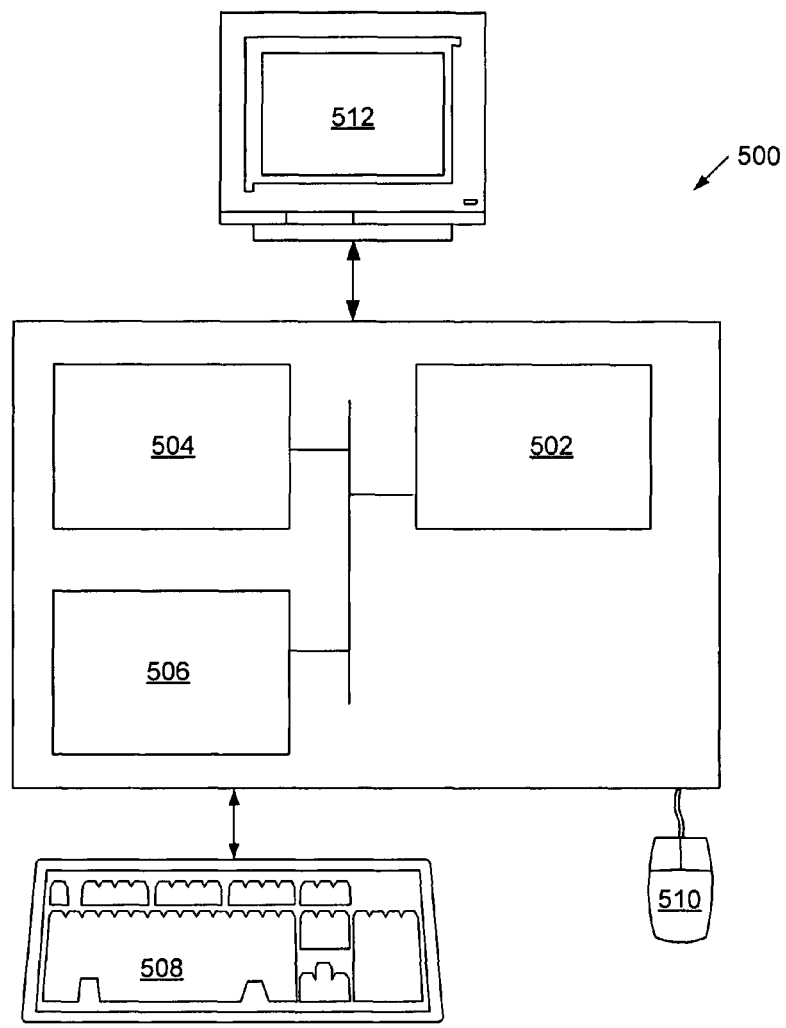
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., user interface, explanation engine, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

One or more embodiments of the invention simplify the understanding of the calculations inherent in a document. Specifically, by explaining the calculations, a user is able to understand the data dependencies that exist and are not readily evident between data containers.

Further, one or more embodiments of the invention shown on the explanation section which data containers are empty or have invalid values. Thus, a user is able to identify and correct any errors in the document that cause a calculated data container to have the incorrect value.

In addition, one or more embodiments of the invention provide a mechanism for a user to update a value in the data containers on the explanation section and have the update propagated through the explanations and the calculations. Thus, in accordance with one or more embodiments of the invention, the user may continually modify values in the precedent data container to obtain a desired value in the dependent data container.

Also, in one or more embodiments of the invention, a user may override the value in a calculated data container if the user is not satisfied with the current value. Then, the user may decide whether to update the precedent data containers or leave the calculated data container with the user specified value.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for reviewing data dependencies in a document comprising:
    receiving a request for a natural language explanation of a dependent data container in a plurality of data containers, wherein the dependent data container resides within a form;
    analyzing computer code, used to generate the form, to identify at least one precedent data container of the dependent data container;
    generating, from the computer code, a natural language explanation of the dependent data container and a natural language explanation of the at least one precedent data container,
        wherein the natural language explanation of the dependent data container describes, in sentence form, the computer code corresponding to the dependent data container,
        wherein the natural language explanation of the at least one precedent data container describes, in sentence form, the computer code corresponding to the at least one precedent data container, and
        wherein generating the natural language explanation of the dependent data container comprises:
            obtaining an abstract syntax tree from the computer code corresponding to the dependent data container, wherein the abstract syntax tree describes the computer code corresponding to the dependent data container and comprises a plurality of compiled tree structure nodes, wherein each of the plurality of compiled tree structure nodes identifies a portion of the computer code;
            obtaining an explain tree by:
                transforming the plurality of compiled tree structure nodes into a plurality of explain nodes, wherein the transforming the plurality of compiled tree structure nodes comprises for each compiled tree structure node of the plurality of compiled tree structure nodes:
                    marking the compiled tree structure node as a current compiled tree structure node;
                    identifying a mapping rule corresponding to the current compiled tree structure node,
                        wherein the mapping rule specifies an object type that maps to at least one selected from a group consisting of a plurality of operators and a plurality of parameters, and
                        wherein the mapping rule is identified based on the current compiled tree structure node comprising at least one selected from a group consisting of an operator of the plurality of operators and a parameter of the plurality parameters;
                    generating a new explain node of the plurality of explain nodes by instantiating the new explain node as the object type specified by the mapping rule, wherein the new explain node comprises data in the current compiled tree structure node as a member variable; and
                    adding the new explain node to a processing stack; and
                storing, in the explain tree, the plurality of explain nodes remaining in the processing stack after the transforming of the plurality of compiled tree structure nodes is complete;

generating a natural language explanation of each explain node of the plurality of explain nodes in the processing by, for each explain node;
  selecting a template matching the object type of the explain node, and
  generating the natural language explanation of the explain node comprising filler words from the template and the member variable comprised in the explain node; and
outputting the natural language explanation of each explain node into a natural language, wherein the natural language explanation of the dependent data container comprises the natural language explanation of each explain node in the natural language, and
displaying the natural language explanation of the dependent data container and the natural language explanation for the at least one precedent data container.

2. The method of claim 1, wherein the at least one precedent data container is empty.

3. The method of claim 2, wherein an appearance of the at least one precedent data container is modified in the natural language explanation.

4. The method of claim 1, wherein the natural language explanation of the dependent data container and the natural language explanation of the at least one precedent data container comprises a plurality of values in the dependent data container and the at least one precedent data container.

5. The method of claim 1, further comprising:
entering a value in the at least one precedent data container on a source section to create an entered value, wherein the natural language explanation of the at least one precedent data container comprises the entered value.

6. The method of claim 1, further comprising:
updating a value in the at least one precedent data container on an explanation section to create an updated value, wherein the natural language explanation of the at least one precedent data container comprises the updated value.

7. The method of claim 6, wherein a source section is updated with the updated value.

8. The method of claim 1, wherein the plurality of data containers are a plurality of fields.

9. The method of claim 1, wherein the natural language explanation of the at least one precedent data container comprises at least one selected from a group consisting of an actual value of the at least one precedent data container, a location of the at least one precedent data container, a warning, a link to the at least one precedent data container, and information identifying whether the at least one precedent data container is empty.

10. A non-transitory computer readable storage medium comprising computer readable program code stored therein for causing a computer processor to create a user interface for explaining a dependent data container, the user interface comprising:
a source section of a form comprising a plurality of data containers; and
an explanation section comprising a natural language explanation of the dependent data container of the plurality of data containers, wherein the explanation section is generated by:
  analyzing computer code, used to generate the form, to identify at least one precedent data container of the dependent data container;
  generating, from the computer code, the natural language explanation of the dependent data container and a natural language explanation of the at least one precedent data container,
  wherein the natural language explanation of the dependent data container describes, in sentence form, the computer code corresponding to the dependent data container,
  wherein the natural language explanation of the at least one precedent data container describes, in sentence form, the computer code corresponding to the at least one precedent data container, and
  wherein generating the natural language explanation of the dependent data container comprises:
    obtaining an abstract syntax tree from the computer code corresponding to the dependent data container, wherein the abstract syntax tree describes the computer code corresponding to the dependent data container and comprises a plurality of compiled tree structure nodes, wherein each of the plurality of compiled tree structure nodes identifies a portion of the computer code;
    obtaining an explain tree by:
      transforming the plurality of compiled tree structure nodes into a plurality of explain nodes, wherein the transforming the plurality of compiled tree structure nodes comprises for each compiled tree structure node of the plurality of compiled tree structure nodes:
        marking the compiled tree structure node as a current compiled tree structure node;
        identifying a mapping rule corresponding to the current compiled tree structure node,
        wherein the mapping rule specifies an object type that maps to at least one selected from a group consisting of a plurality of operators and a plurality of parameters, and
        wherein the mapping rule is identified based on the current compiled tree structure node comprising at least one selected from a group consisting of an operator of the plurality of operators and a parameter of the plurality of parameters;
        generating a new explain node of the plurality of explain nodes by instantiating the new explain node as the object type specified by the mapping rule, wherein the new explain node comprises data in the current compiled tree structure node as a member variable; and
        adding the new explain node to a processing stack; and
      storing, in the explain tree, the plurality of explain nodes remaining in the processing stack after the transforming of the plurality of compiled tree structure nodes is complete;
    generating a natural language explanation of each explain node of the plurality of explain nodes explain node:
      selecting a template matching the object type of the explain node, and
      generating the natural language explanation of the explain node comprising filler words from the template and the member variable comprised in the explain node; and
    outputting the natural language explanation of each explain node into a natural language, wherein the natural language explanation of the dependent data container comprises the natural language explanation of each explain node in the natural language.

11. The non-transitory computer readable storage medium of claim 10, wherein the at least one precedent data container is empty.

12. The non-transitory computer readable storage medium of claim 11, wherein an appearance of the at least one precedent data container is modified in the explanation section.

13. The non-transitory computer readable storage medium of claim 10, wherein the explanation section comprises a plurality of values in the dependent data container and the at least one precedent data container.

14. The non-transitory computer readable storage medium of claim 10, wherein the at least one precedent data container on the source section is entered with a value to create an entered value, wherein the natural language explanation of the at least one precedent data container comprises the entered value.

15. The non-transitory computer readable storage medium of claim 10, wherein the explanation section is updated with a value in the at least one precedent data container to create an updated value, wherein the natural language explanation of the at least one precedent data container comprises the updated value.

16. The non-transitory computer readable storage medium of claim 15, wherein the source section is updated with the updated value.

17. The non-transitory computer readable storage medium of claim 10, wherein the source section is a financial form, and the plurality of data containers are a plurality of fields in the financial form.

18. The non-transitory computer readable storage medium of claim 10, wherein the natural language explanation of the at least one precedent data container comprises at least one selected from a group consisting of an actual value of the at least one precedent data container, a location of the at least one precedent data container, a warning, a link to the at least one precedent data container, and information identifying whether the at least one precedent data container is empty.

19. A system for describing dependencies in a document comprising:
   a computer processor;
   a user interface configured to receive a request for explaining the dependent data container in a plurality of data containers, wherein the dependent data container resides within a form; and
   an explanation engine configured to execute on the computer processor and configured to:
      analyze computer code, used to generate the form, to identify at least one precedent data container of the dependent data container;
      generate, from the computer code, a natural language explanation of the dependent data container and a natural language explanation of the at least one precedent data container,
         wherein the natural language explanation of the dependent data container describes, in sentence form, the computer code corresponding to the dependent data container,
         wherein the natural language explanation of the at least one precedent data container describes, in sentence form, the computer code corresponding to the at least one precedent data container, and
         wherein generating the natural language explanation of the dependent data container comprises:
            obtaining an abstract syntax tree from the computer code corresponding to the dependent data container, wherein the abstract syntax tree describes the computer code corresponding to the dependent data container and comprises a plurality of compiled tree structure nodes, wherein each of the plurality of compiled tree structure nodes identifies a portion of the computer code;
            obtaining an explain tree by:
               transforming the plurality of compiled tree structure nodes into a plurality of explain nodes, wherein the transforming the plurality of compiled tree structure nodes comprises for each compiled tree structure node of the plurality of compiled tree structure nodes:
                  marking the compiled tree structure node as a current compiled tree structure node;
                  identifying a mapping rule corresponding to the current compiled tree structure node,
                     wherein the mapping rule specifies an object type that maps to at least one selected from a group consisting of a plurality of operators and a plurality of parameters, and
                     wherein the mapping rule is identified based on the current compiled tree structure node comprising at least one selected from a group consisting of an operator of the plurality of operators and a parameter of the plurality of parameters;
                  generating a new explain node of the plurality of explain nodes by instantiating the new explain node as the object type specified by the mapping rule, wherein the new explain node comprises data in the current compiled tree structure node as a member variable; and
                  adding the new explain node to a processing stack; and
               storing, in the explain tree, the plurality of explain nodes remaining in the processing stack after the transforming of the plurality of compiled tree structure nodes is complete;
            generating a natural language explanation of each explain node of the plurality of explain nodes explain node;
               selecting a template matching the object type of the explain node, and
               generating the natural language explanation of the explain node comprising filler words from the template and the member variable comprised in the explain node; and
         outputting the natural language explanation of each explain node into a natural language, wherein the natural language explanation of the dependent data container comprises the natural language explanation of each explain node in the natural language, and
      output the natural language explanation of the dependent data container and the natural language explanation of the at least one precedent data container within an explanation section.

20. The system of claim 19, wherein the at least one precedent data container is empty, and wherein an appearance of the at least one precedent data container is modified in the natural language explanation of the at least one precedent data container.

21. The system of claim 19, wherein the natural language explanation of the dependent data container and the natural language explanation of the at least one precedent data container comprises a plurality of values in the dependent data container and the at least one precedent data container.

22. The system of claim 19, wherein the user interface is further configured to receive a value entered in the at least one precedent data container on a source section to create an entered value, and wherein the explanation engine is configured to enter the entered value into the natural language explanation of the at least one precedent data container.

23. The system of claim 19, wherein the natural language explanation of the at least one precedent data container comprises at least one selected from a group consisting of an actual value of the at least one precedent data container, a location of the at least one precedent data container, a warning, a link to the at least one precedent data container, and information identifying whether the at least one precedent data container is empty.

24. A computer readable storage medium comprising computer readable program code stored therein for causing a computer processor to perform a method for describing dependencies in a document, the method comprising:
  receiving a request for a natural language explanation of a dependent data container in a plurality of data containers, wherein the dependent data container resides within a form;
  analyzing computer code, used to generate the form, to identify at least one precedent data container of the dependent data container;
  generating, from the computer code, a natural language explanation of the dependent data container and a natural language explanation of the at least one precedent data container,
    wherein the natural language explanation of the dependent data container describes, in sentence form, the computer code corresponding to the dependent data container,
    wherein the natural language explanation of the at least one precedent data container describes, in sentence form, the computer code corresponding to the at least one precedent data container, and
    wherein generating the natural language explanation of the dependent data container comprises:
      obtaining an abstract syntax tree from the computer code corresponding to the dependent data container, wherein the abstract syntax tree describes the computer code corresponding to the dependent data container and comprises a plurality of compiled tree structure nodes, wherein each of the plurality of compiled tree structure nodes identifies a portion of the computer code;
      obtaining an explain tree by:
        transforming the plurality of compiled tree structure nodes into a plurality of explain nodes, wherein the transforming the luralit of compiled tree structure nodes comprises for each compiled tree structure node of the plurality of compiled tree structure nodes:
          marking the compiled tree structure node as a current compiled tree structure node;
          identifying a mapping rule corresponding to the current compiled tree structure node,
          wherein the mapping rule specifies an object type that maps to at least one selected from a group consisting of a plurality of operators and a plurality of parameters, and
          wherein the mapping rule is identified based on the current compiled tree structure node comprising at least one selected from a group consisting of an operator of the plurality of operators and a parameter of the plurality of parameters;
          generating a new explain node of the plurality of explain nodes by instantiating the new explain node as the object type specified by the mapping rule, wherein the new explain node comprises data in the current compiled tree structure node as a member variable; and
          adding the new explain node to a processing stack; and
        storing, in the explain tree, the plurality of explain nodes remaining in the processing stack after the transforming of the plurality of compiled tree structure nodes is complete;
      generating a natural language explanation of each explain node of the plurality of explain nodes in the processing by, for each explain node;
        selecting a template matching the object type of the explain node, and
        generating the natural language explanation of the explain node comprising filler words from the template and the member variable comprised in the explain node; and
      outputting the natural language explanation of each explain node into a natural language, wherein the natural language explanation of the dependent data container comprises the natural language explanation of each explain node in the natural language, and
    displaying the natural language explanation of the dependent data container and the natural language explanation for the at least one precedent data container.

25. The non-transitory computer readable storage medium of claim 24, wherein the at least one precedent data container is empty, and wherein an appearance of the at least one precedent data container is modified in the natural language explanation of the at least one precedent data container.

26. The non-transitory computer readable storage medium of claim 24, wherein the natural language explanation of the dependent data container and the natural language explanation of the at least one precedent data container comprises a plurality of values in the dependent data container and the at least one precedent data container.

27. The non-transitory computer readable storage medium of claim 24, wherein the natural language explanation of the at least one precedent data container comprises at least one selected from a group consisting of an actual value of the at least one precedent data container, a location of the at least one precedent data container, a warning, a link to the at least one precedent data container, and information identifying whether the at least one precedent data container is empty.

* * * * *

UNITED STATES PATENT AND TRADEMARK OFFICE
CERTIFICATE OF CORRECTION

| | | |
|---|---|---|
| PATENT NO. | : 8,032,822 B1 | Page 1 of 1 |
| APPLICATION NO. | : 11/494915 | |
| DATED | : October 4, 2011 | |
| INVENTOR(S) | : Michael A. Artamonov et al. | |

It is certified that error appears in the above-identified patent and that said Letters Patent is hereby corrected as shown below:

In Claim 1, Column 16 (line 55), --of-- should be added after "plurality".

In Claim 10, Column 18 (line 57), --in the processing by, for each-- should be added after "nodes".

In Claim 19, Column 20 (line 43), --in the processing by, for each-- should be added after "nodes".

In Claim 24, Column 21, (line 53), "luralit" should read as --plurality--.

Signed and Sealed this
Twenty-ninth Day of November, 2011

David J. Kappos
*Director of the United States Patent and Trademark Office*